United States Patent
Darbha et al.

(10) Patent No.: US 9,673,937 B2
(45) Date of Patent: Jun. 6, 2017

(54) ADAPTIVE NETWORK COMMUNICATION PROTOCOLS

(71) Applicant: International Business Machines Corporation, Armonk, NY (US)

(72) Inventors: Venkata Kiran Kumar Darbha, Hyderabad (IN); Savitha Joshi, Bangalore (IN); Nir Naaman, Haifa (IL); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 14/880,615

(22) Filed: Oct. 12, 2015

(65) Prior Publication Data

US 2017/0104555 A1    Apr. 13, 2017

(51) Int. Cl.
*H04L 1/18* (2006.01)
*H04L 1/08* (2006.01)
*H04L 29/06* (2006.01)
*H04L 29/12* (2006.01)
(Continued)

(52) U.S. Cl.
CPC ............. *H04L 1/08* (2013.01); *H04L 1/1607* (2013.01); *H04L 61/2503* (2013.01); *H04L 69/161* (2013.01); *H04L 69/22* (2013.01); *H04L 69/326* (2013.01)

(58) Field of Classification Search
CPC ..... H04L 1/08; H04L 1/1607; H04L 61/2503; H04L 69/161; H04L 69/22; H04L 69/326
See application file for complete search history.

(56) References Cited

U.S. PATENT DOCUMENTS

| | | | | |
|---|---|---|---|---|
| 7,051,102 | B2* | 5/2006 | Gupta | ............... H04L 29/12009 707/999.009 |
| 7,251,694 | B2* | 7/2007 | Gupta | ............... H04L 29/12009 707/999.009 |

(Continued)

FOREIGN PATENT DOCUMENTS

| | | |
|---|---|---|
| DE | 102011103631 B4 | 12/2012 |
| WO | 2009121802 A1 | 10/2009 |

*Primary Examiner* — Esaw Abraham
(74) *Attorney, Agent, or Firm* — Lance I. Hochhauser

(57) ABSTRACT

A computer-implemented method includes sending one or more network packets. Each of the one or more network packets includes a network packet header. The computer implemented method further includes receiving a negative acknowledgement list comprising the network packets not received. The computer-implemented method further includes, responsive to the receiving of a negative acknowledgment list: For each network packet of the negative acknowledgment list, transforming the network packet header into a modified packet header to yield a modified packet. The computer-implemented method further includes combining each modified packet into a modified packet list. The computer-implemented method further includes generating one or more repair packets. Each of the one or more repair packets further include a repair packet header and a portion of the modified packet list. The computer-implemented method further includes sending the one or more repair packets. A corresponding computer system and computer program product are also disclosed.

20 Claims, 8 Drawing Sheets

(51) Int. Cl.
*H04L 29/08* (2006.01)
*H04L 1/16* (2006.01)

(56) References Cited

U.S. PATENT DOCUMENTS

| | | | | |
|---|---|---|---|---|
| 7,376,150 | B2 * | 5/2008 | Vedantham | H04L 12/1868 370/312 |
| 7,532,621 | B2 * | 5/2009 | Birman | H04L 12/1868 370/389 |
| 7,590,922 | B2 * | 9/2009 | Vedantham | H04L 1/1628 714/776 |
| 7,607,062 | B2 | 10/2009 | Grove et al. | |
| 8,155,035 | B2 * | 4/2012 | Futenma | H04L 29/06027 370/282 |
| 8,488,583 | B2 * | 7/2013 | Pelletier | H04W 28/06 370/255 |
| 8,514,718 | B2 * | 8/2013 | Zijst | H04L 12/1836 370/238 |
| 8,605,642 | B2 | 12/2013 | Larsson et al. | |
| 8,612,617 | B2 * | 12/2013 | Yaqoob | H04L 12/1868 370/312 |
| 9,209,943 | B1 * | 12/2015 | Firoiu | H04L 1/1607 |
| 9,414,094 | B2 * | 8/2016 | Van Zijst | H04L 47/125 |
| 2002/0069388 | A1 | 6/2002 | Niu et al. | |

\* cited by examiner

ADAPTIVE NETWORK COMMUNICATION PROTOCOLS

BACKGROUND

The present invention relates generally to network transport protocols and in particular to reliable multicast network transport protocols.

The Internet Protocol ("IP") is the principal communications protocol for relaying datagrams across network boundaries. Generally, the IP has the task of delivering packets from a source host to a destination host solely based on the IP addresses in the packet headers. More specifically, the IP creates packet structures that encapsulate the data to be delivered. Additionally, the packet structures also define addressing methods that are used to label the datagram with source and destination information. In a multicast network, such as User Datagram Protocol ("UDP"), an addressing method is provided for the delivery of information to a group of destinations simultaneously using the most efficient strategy to deliver the messages over each link of the network only once. Thus, since multicast networks, such as UDP, deliver messages over a network link only once, there remains no guarantee that the datagram packet will be successfully delivered. To ensure the successful delivery of a datagram packet, a reliable multicast protocol may be added as a layer on top of UDP. This reliable multicast protocol adds the ability of UDP to detect lost messages and take corrective action by sending a Negative Acknowledgment ("NAK") to the host. Once the NAK is received by the host, Repair Data ("RDATA"), consisting of individual packets, are then sent from the host to the designated destination targets. However, the transmission of RDATA can be timely.

SUMMARY

A computer-implemented method includes sending one or more network packets from a sending node to one or more receiving nodes, wherein each of the one or more network packets includes a network packet header. The computer-implemented method further includes receiving a negative acknowledgement list from the one or more receiving nodes. The negative acknowledgment list comprises those of the one or more network packets that were not successfully received. The computer-implemented method further includes, responsive to the receiving of a negative acknowledgment list: for each network packet of the negative acknowledgment list, transforming the network packet header into a modified packet header to yield a modified packet. The computer-implemented method further includes combining each of the modified packets into a modified packet list. The computer-implemented method further includes generating, by the sending node, one or more repair packets. Each of the one or more repair packets includes a repair packet header and a portion of the modified packet list. The computer-implemented method further includes sending the one or more repair packets to the one or more receiving nodes. A corresponding computer system and computer program product are also disclosed.

DETAILED DESCRIPTION

Figure 1:
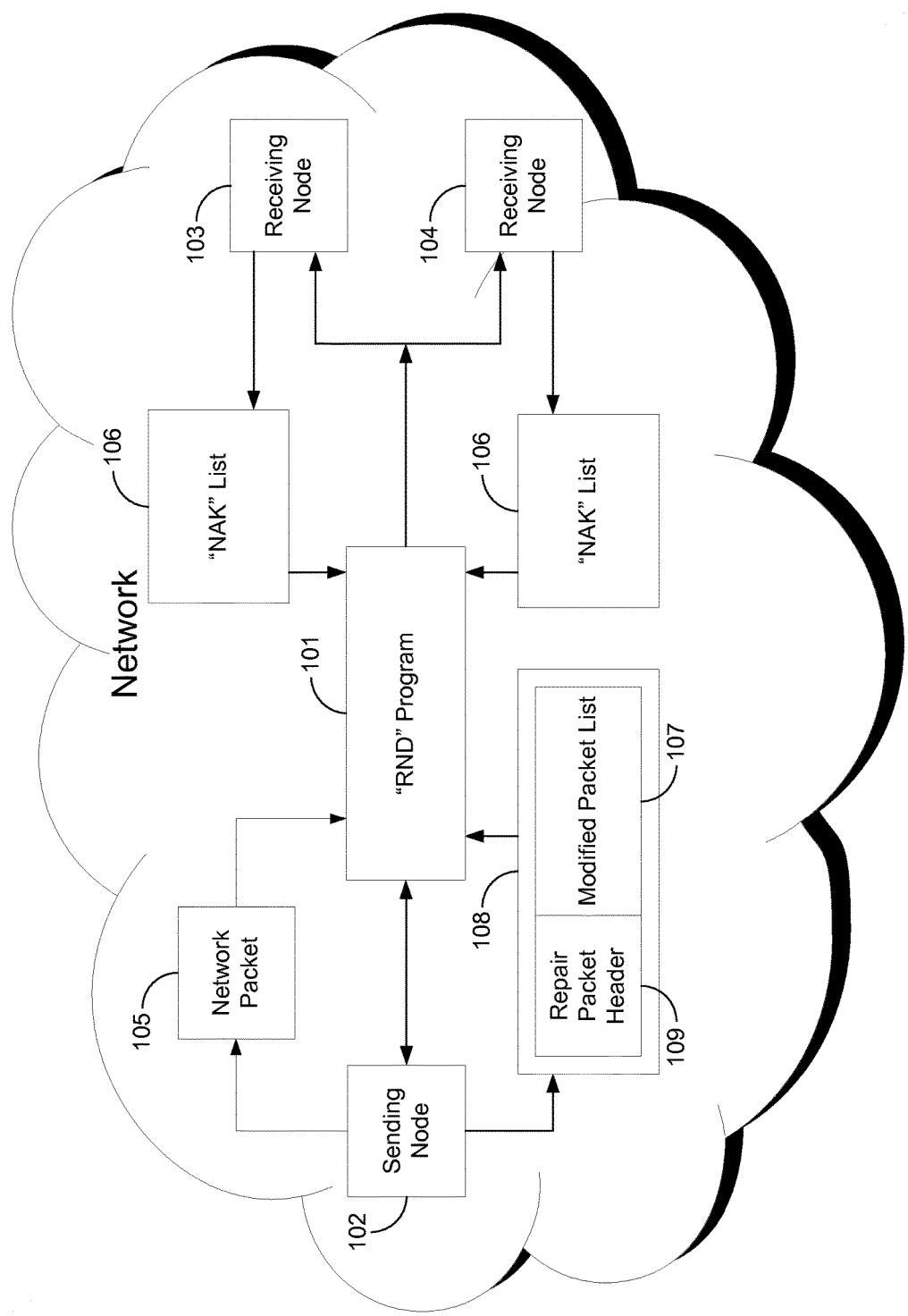
FIG. 1 is a network diagram of an operational environment for an "RND" program, in accordance with at least one embodiment of the invention.

Referring now to various embodiments of the invention in more detail, FIG. 1 is a network diagram of an operational environment for an "RND" program, in accordance with at least one embodiment of the invention. Within a network 100, a Repair Network Data ("RND") program 101 may send one or more network packets 105 from a sending node 102 to one or more receiving nodes 103, 104. Each of the one or more network packets 105 includes a network packet header. Generally, the RND program 101 may exist within an Internet Protocol ("IP") network. More specifically, the IP network may support a User Datagram Protocol ("UDP").

There are numerous Internet applications that use a UDP network, including the Domain Name System ("DNS"), Simple Network Management Protocol ("SNMP"), Routing Information Protocol ("RIP"), and Dynamic Host Configuration Protocol ("DHCP"). Within any of the aforementioned applications, the sending node 102 and one or more receiving nodes 103, 104 may include any device that is able to exchange information with the other device, whether or not they have a direct connection to each other. Here, the sending node 102 may be a transmitting device and the one or more receiving nodes 103, 104 may be a receiving device. For example, the sending node 102 and one or more receiving nodes 103, 104 may include hosts such as desktop computers, phones, servers, as well as networking hardware.

The RND program 101 may further receive a negative acknowledgment list ("NAK") 106 from the one or more receiving nodes 103, 104. The NAK list includes those of the one or more network packets 105 that were not successfully received by the one or more receiving nodes 103, 104. The RND program 101 may further, responsive to receiving a negative acknowledgment list 106 from the one or more receiving nodes 103, 104 for each network packet 105 of the NAK list 106, transform the network packet header into a modified packet header to yield a modified packet. The RND program 101 may further combine each modified packet into a modified packet list 107. The RND program 101 may further generate, by the sending node 102, one or more repair packets 108. Each of the one or more repair packets 108 includes a repair packet header 109 and a portion of the modified packet list 107. The one or more repair packets 108 may be defaulted to a maximum network transmission size.

The RND program 101 may further send the one or more repair packets 108 to the one or more receiving nodes 103, 104.

Figure 2:
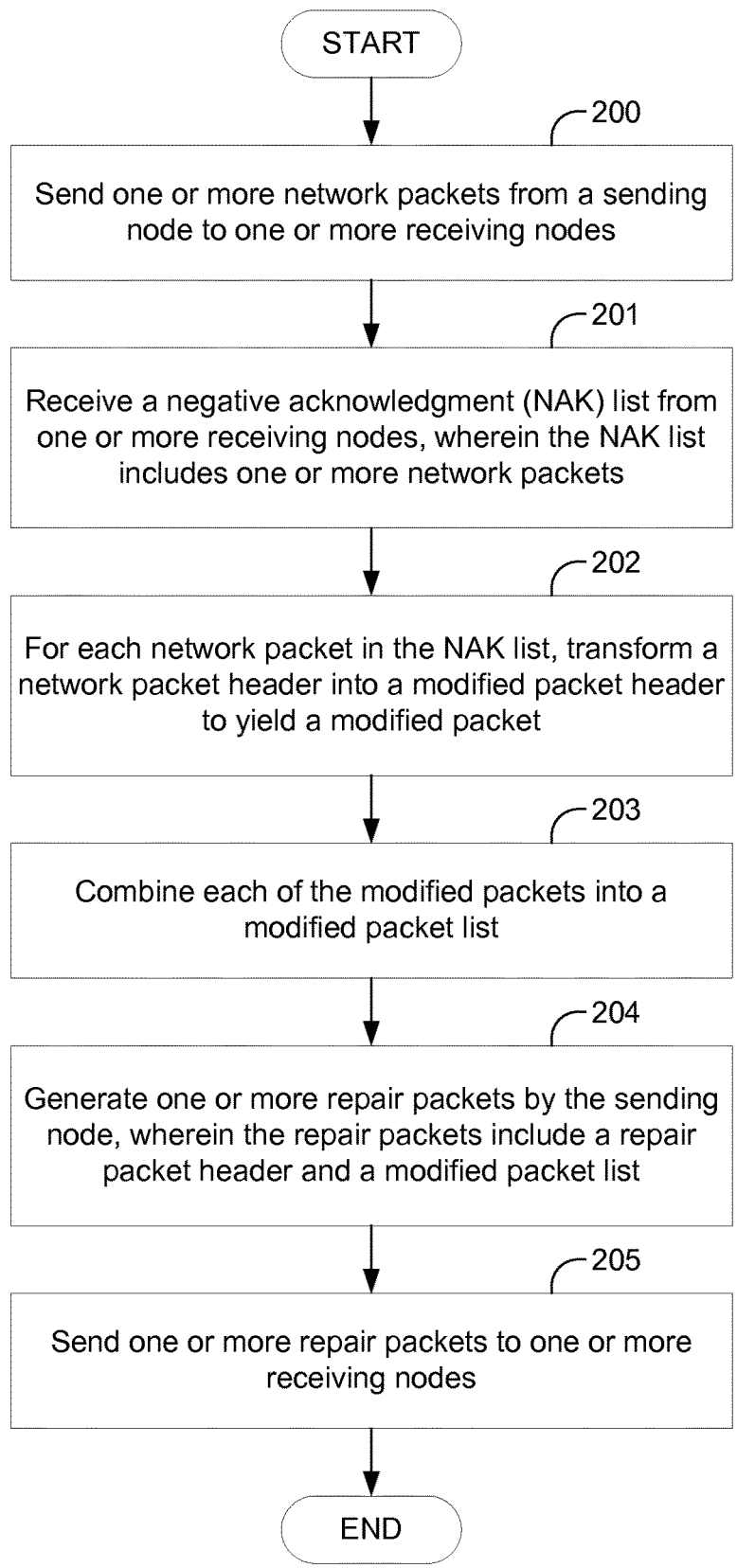
FIG. 2 is a flow chart diagram depicting operational steps for an "RND" program in accordance with at least one embodiment of the invention.

Referring now to the flow chart diagram of FIG. 2, FIG. 2 is a flow chart diagram depicting operational steps for an RND program in accordance with at least one embodiment of the invention. Generally, the RND program 101 may exist within an "IP" network. More specifically, the IP network may support a User Datagram Protocol "UDP." According to the depicted embodiment, at step 200, the RND program 101 may send one or more network packets 105 from a sending node 102 to one or more receiving nodes 103, 104. Each of the one or more network packets 105 includes a network packet header.

Generally, a network packet 105 is a formatted unit of data made up of a list of bits or bytes. More specifically, a network packet 105 may consist of two types of data: control information and user data or payload. The control information provides data the network needs to deliver the user data. For example, the RND program 101 may receive control information, such as source and destination network addresses, error detection codes, and sequencing information. The control information may be found in the network packet header, whereas the payload data may be located between the network packet header and a trailer. Once the one or more receiving nodes 103, 104 have received the network packet 105, the user data or payload may be reassembled into their original message.

At step 201, the RND program 101 may receive a NAK list 106 from the one or more receiving nodes 103, 104. The NAK list 106 includes those of the one or more network packets 105 that were lost or not successfully received by the one or more receiving nodes 103, 104. In order to detect the loss of a network packet 105, a reliable multicast protocol layer may be added on top of the UDP network. The addition of a reliable multicast protocol layer on top of the UDP network provides loss detection of the one or more network packets 105, as well as retransmission of one or more repair packets 108 by the sending node 102. For example, the RND program 101 may include a reliable multicast protocol layer, such as Pragmatic General Multicast ("PGM") or Scalable Reliable Multicast ("SRM").

At step 202, responsive to receiving a NAK list 106 from the one or more receiving nodes 103, 104, the RND program 101 may, for each network packet 105 of the NAK list 106, transform the network packet header into a modified packet header to yield a modified packet. At step 203, the RND program 101 may combine each modified packet into a modified packet list 107.

Figure 3:
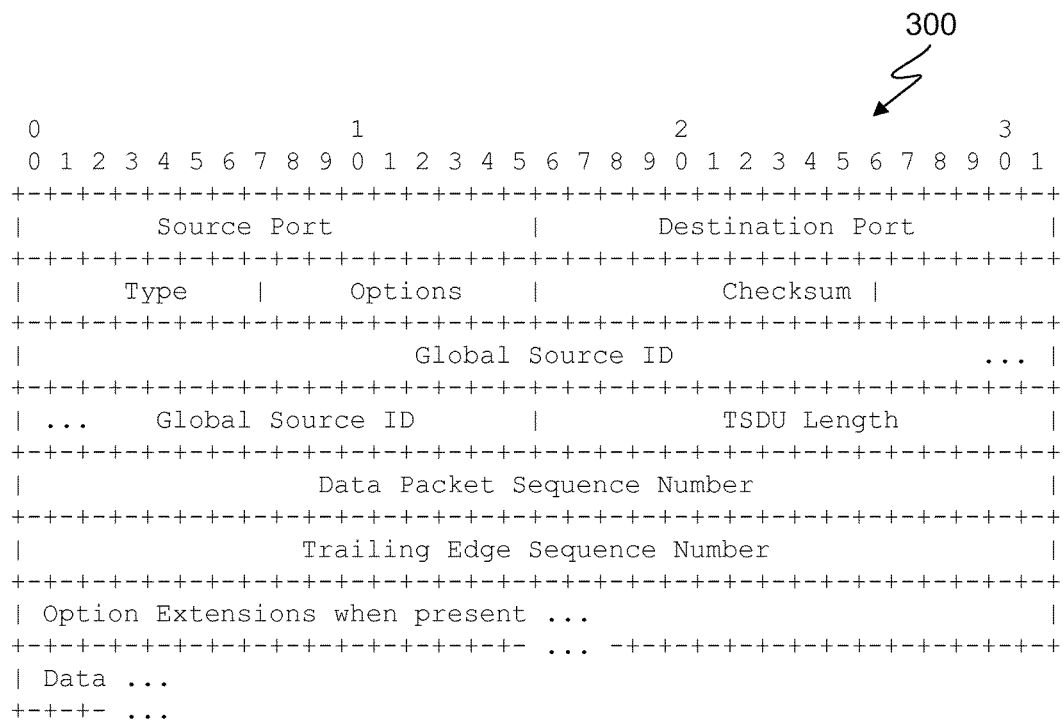
FIG. 3 is a textual representation of an exemplary repair packet in accordance with at least one embodiment of the invention.

Referring now to Figure, FIG. 3 depicts a textual representation of an exemplary repair packet in accordance with at least one embodiment of the invention. In the depicted embodiment, the network packet header may include the following blocks of data: (a) a source port block, which is a random port number generated by the sending node; (b) a destination port block, which is a globally well-known port number assigned to the receiving node; (c) a type block, which defines the version and specific type of packet; (d) an options block, which encodes binary indications of the presence and significance of additional information on the packet or the way it should be processed; (e) a checksum block, which detects error which may have been introduced during the packets transmission or storage; (f) a global source I.D. block, which is a globally unique source identifier; (g) a TSDU length block, which is the length in bytes of the transport data unit exclusive of the transport header; (h) a data packet sequence number, which specifies the number assigned to the first byte of data in the current message and a trailing edge sequence number, which specifies the number assigned to the last byte of data in the current message.

Turning back to FIG. 2, at step 204, the RND program 101 may generate, by the sending node 102, one or more repair packets 108. Each of the one or more repair packets 108 may be defaulted to a maximum network transmission size. Each of the one or more repair packets 108 may include a repair packet header 109 and a portion of the modified packet list 107.

Figure 4:
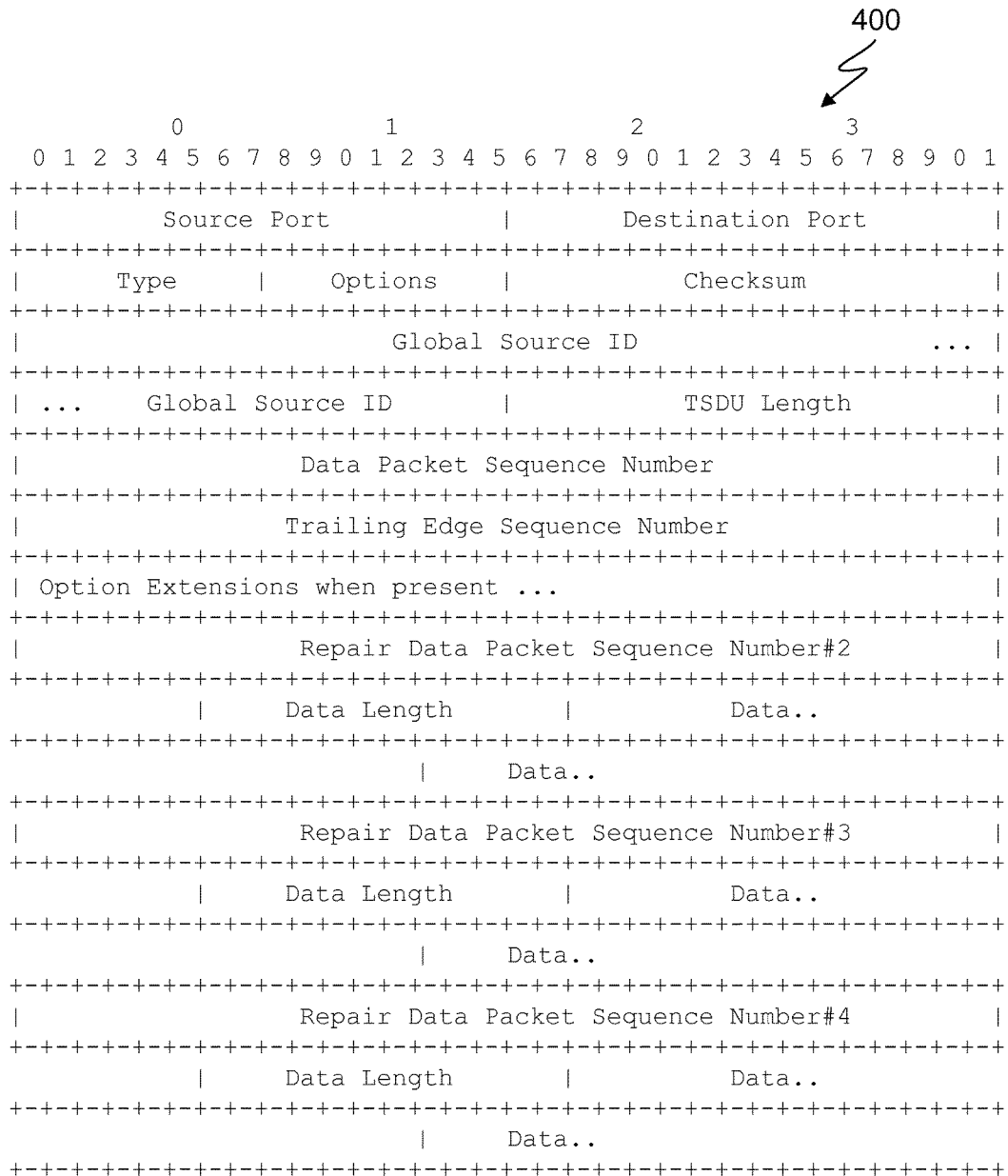
FIG. 4 is a textual representation of an exemplary repair packet including a repair packet header and modified packet list in accordance with at least one embodiment of the invention.

Referring now to FIG. 4, FIG. 4 is a textual representation of an exemplary repair packet including a repair packet header and modified packet list in accordance with at least one embodiment of the invention. Here, the repair packet header 109 may include a source port block, destination port block, type block, options block, checksum block, global source I.D. block, TSDU length block, data packet sequence number, and trailing edge sequence number. The modified packet list 107 may include each modified packet. Each modified packet may further include the sequence number, data length, and user data or payload. Each modified packet includes the same sequence number, data length, and user data or payload as the corresponding network packet of the NAK list 106. It should be appreciated that the repair packet 108, which includes the repair packet header 109 and the modified packet list 107, does not contain any duplicative data blocks.

Turning back to FIG. 2, at step 205, the RND program 101 may send one or more repair packets 108 to one or more receiving nodes 103, 104.

Figure 5:
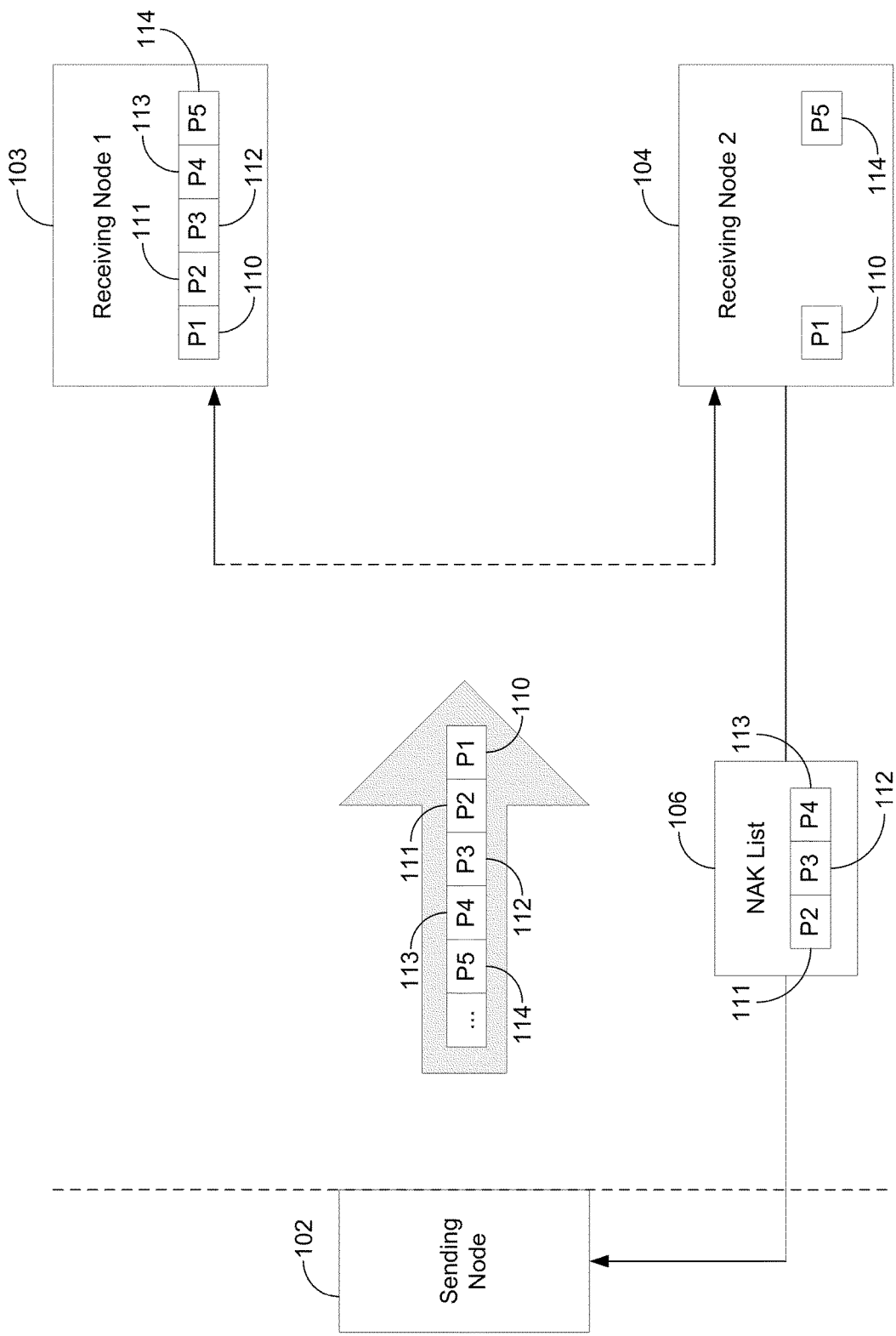
FIG. 5 is a data flow diagram for a portion of a worked example of an "RND" program, in accordance with at least one embodiment of the invention.

FIG. 5 is a data flow diagram for a portion of a worked example of an "RND" program, in accordance with at least one embodiment of the invention. In the depicted embodiment, the RND program 101 may send one or more network packets 110-114 from a sending node 102 to one or more receiving nodes 103, 104. Here, the receiving node 103 has received one or more network packets 110-114 and the receiving node 104 has received one or more network packets 110, 114. Since one or more network packets 111-113 were not successfully received by the receiving node 104, the RND program 101 may receive a NAK list 106 from the receiving node 104 including those of the network packets 111-113 that were not successfully received.

Figure 6:
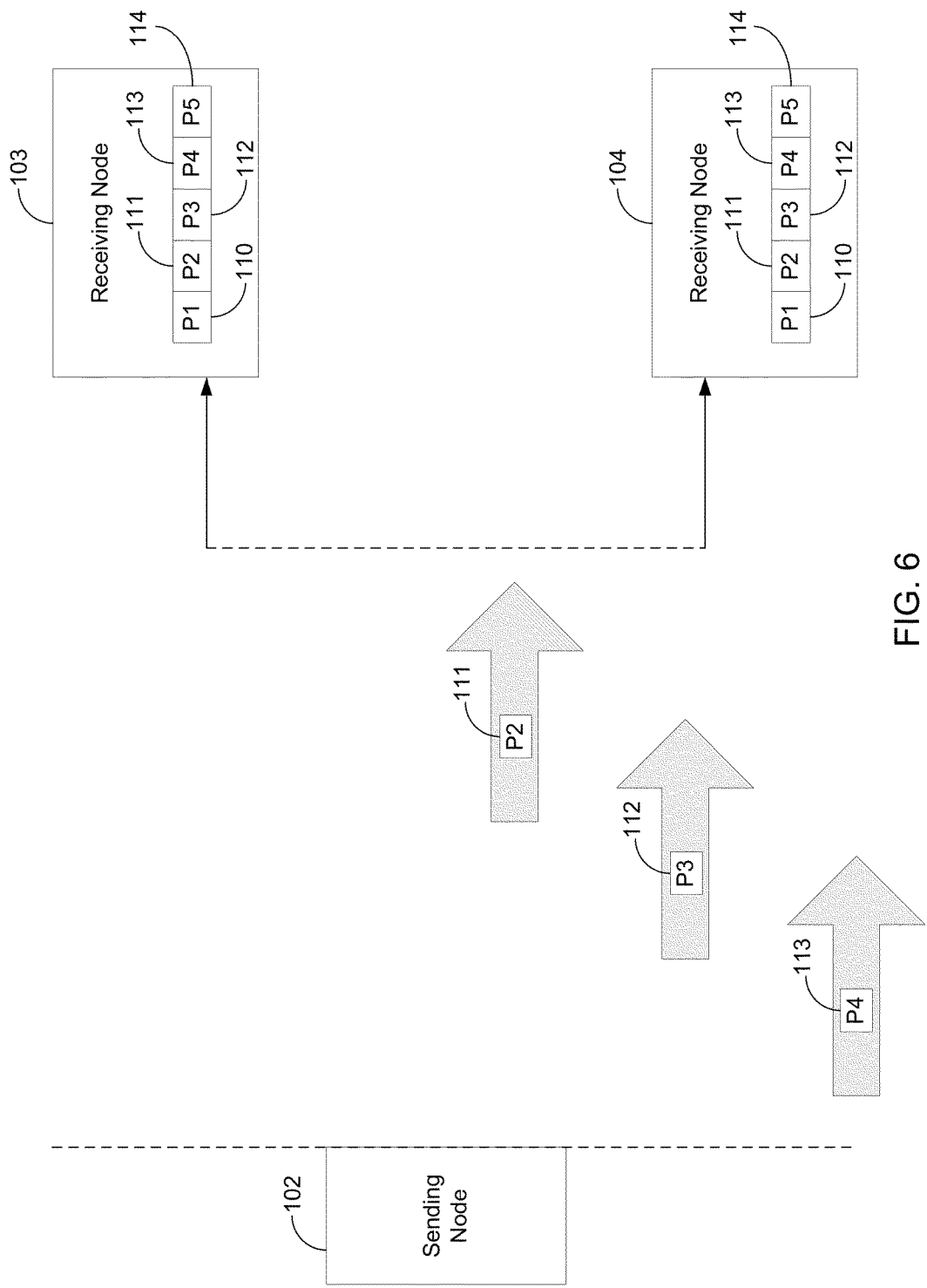
FIG. 6 is a data flow diagram for a portion of a worked example of an "RND" program, in accordance with at least one embodiment of the invention.

FIG. 6 is a data flow diagram for a portion of a worked example of an "RND" program, in accordance with at least one embodiment of the invention. In the depicted embodiment, the RND program 101 may generate one or more repair packets 111-113. Each of the one or more repair packets 111-113 may include one network packet of the NAK list 106. The RND program 101 may send the one or more repair packets 111-113 stepwise. For example, the RND program 101 may send the repair packet 111 from the sending node 102 to the receiving node 104. Upon successful delivery of the repair packet 111 by the receiving node 104, the RND program 101 may send the repair packet 112 from the sending node 102 to the receiving node 104. Upon successful delivery of the network packet 112 by the receiving node 104, the RND program 101 may send the repair packet 113 from the sending node 102 to the receiving node 104.

Figure 7:
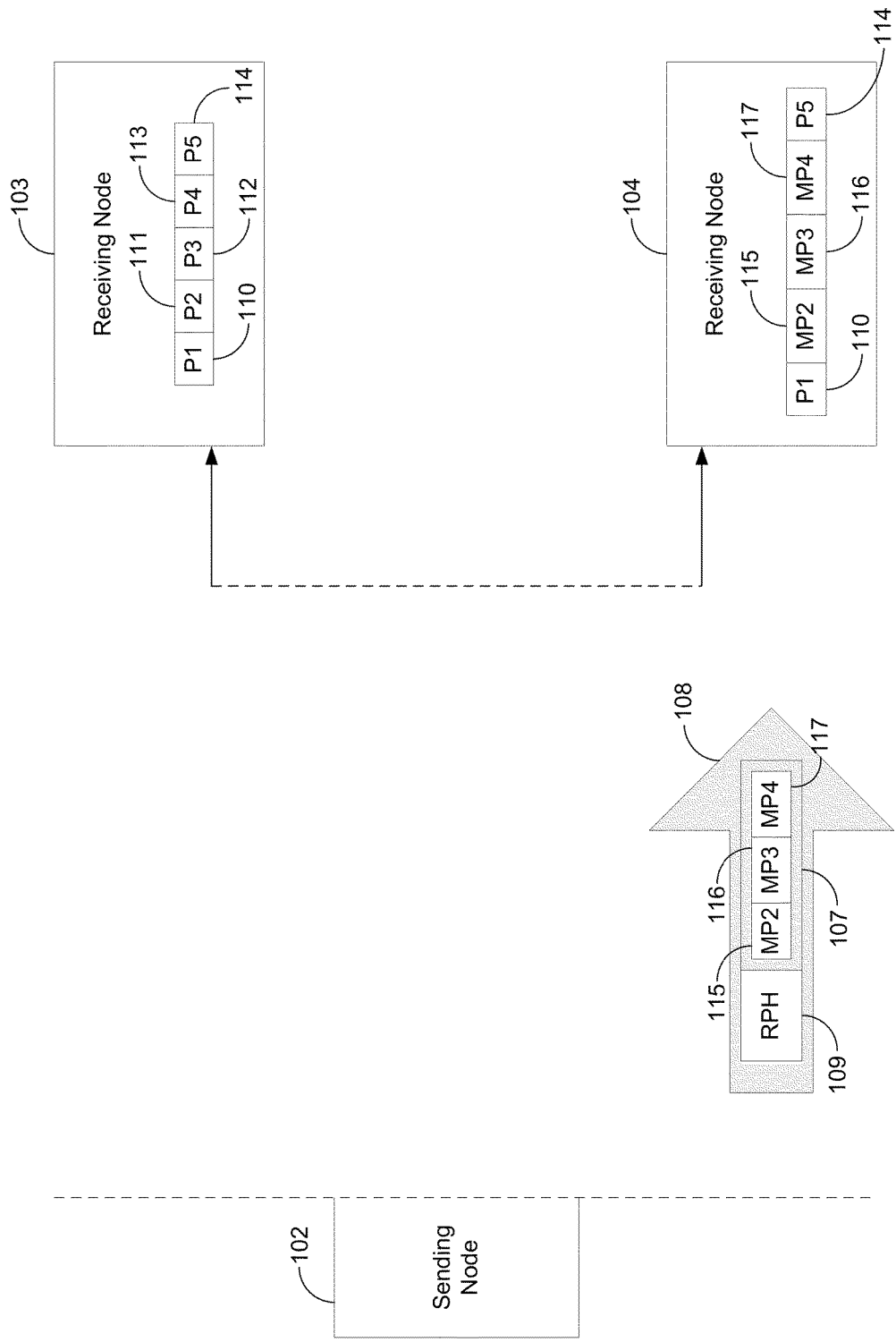
FIG. 7 is a data flow diagram for a portion of a worked example of an "RND" program, in accordance with at least one embodiment of the invention.

FIG. 7 is a data flow diagram for a portion of a worked example of an RND program, in accordance with at least one embodiment of the invention. In the depicted embodiment, responsive to receiving the NAK list 106 from the receiving node 104, for each network packet 111-113 of the NAK list 106, the RND program 101 may transform the network packet header into a modified packet header to yield a modified packet. The RND program 101 may combine each modified packet into a modified packet list 107. Here, the modified packet list 107 includes the modified packets 115-117. The modified packets 115-117 include the same sequence number, data length, and user data or payload as the corresponding network packets 111-113 of the NAK list 106. The RND program 101 may generate, by the sending node 102, one or more repair packets 108. Here, the repair packet 108 includes a repair packet header 109 and the modified packet list 107. The RND program 101 may send the repair packet 108 to the receiving node 104 in a single transmission.

Figure 8:
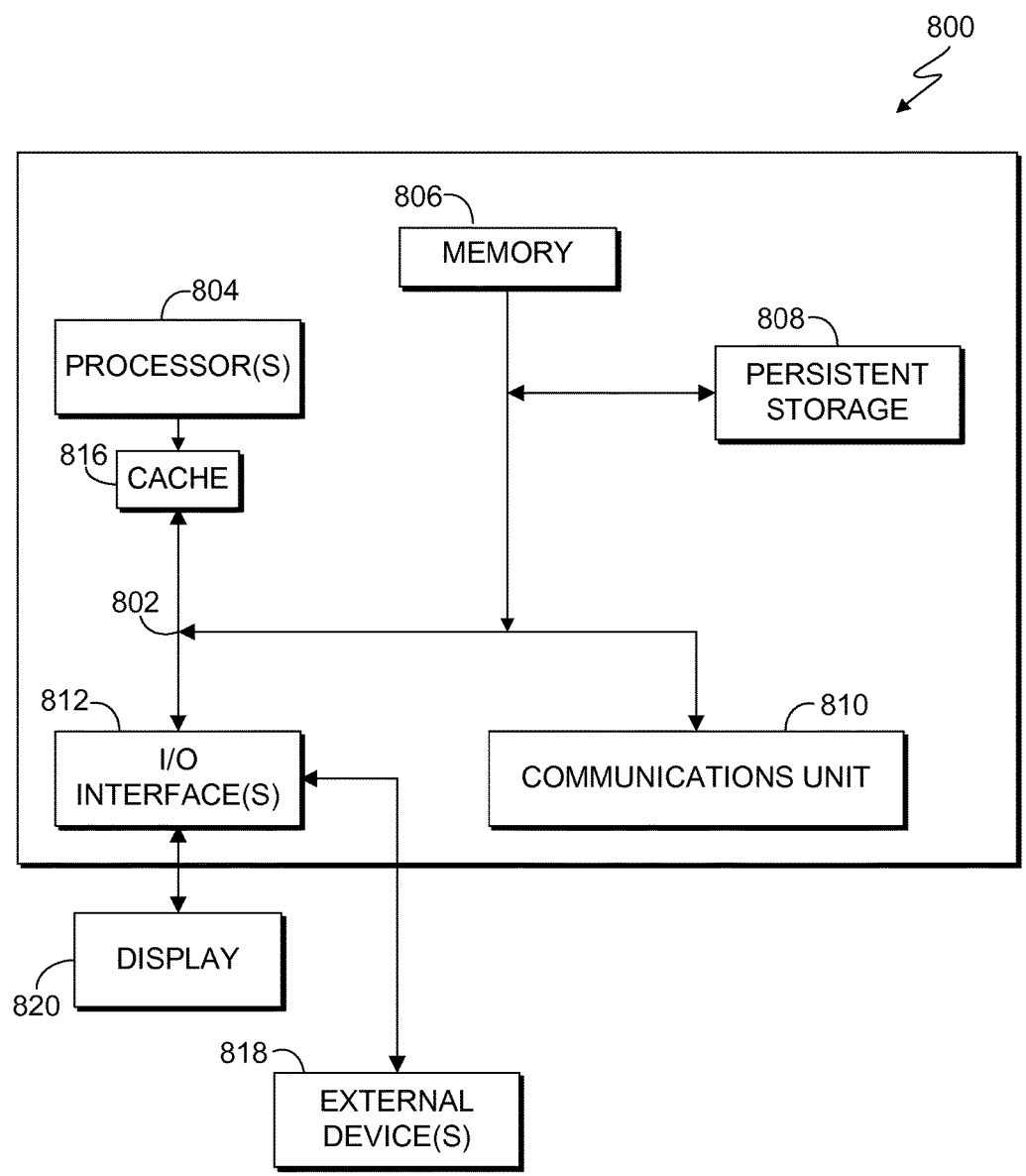
FIG. 8 is a block diagram of a computing apparatus 800 suitable for executing the "RND" program in accordance with at least one embodiment of the invention.

FIG. 8 is a block diagram depicting components of a computer 800 suitable for executing the RND program 101. FIG. 8 displays the computer 800, the one or more processor(s) 804 (including one or more computer processors), the communications fabric 802, the memory 806, the RAM, the cache 818, the persistent storage 808, the communications unit 812, the I/O interfaces 814, the display 822, and the external devices 820. It should be appreciated that FIG. 8 provides only an illustration of one embodiment and does not imply any limitations with regard to the environments in which different embodiments may be implemented. Many modifications to the depicted environment may be made.

As depicted, the computer 800 operates over a communications fabric 802, which provides communications between the computer processor(s) 804, memory 806, persistent storage 808, communications unit 812, and input/output (I/O) interface(s) 814. The communications fabric 802 may be implemented with any architecture suitable for passing data or control information between the processors 804 (e.g. microprocessors, communications processors, and network processors), the memory 806, the external devices 820, and any other hardware components within a system. For example, the communications fabric 802 may be implemented with one or more buses.

The memory 806 and persistent storage 808 are computer readable storage media. In the depicted embodiment, the memory 806 comprises a random access memory (RAM) and a cache 818. In general, the memory 806 may comprise any suitable volatile or non-volatile one or more computer readable storage media.

Program instructions for the RND program 101 may be stored in the persistent storage 708, or more generally, any computer readable storage media, for execution by one or more of the respective computer processors 804 via one or more memories of the memory 806. The persistent storage 808 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 812, in these examples, provides for communications with other data processing systems or devices. In these examples, the communications unit 812 may comprise one or more network interface cards. The communications unit 812 may provide communications through the use of either or both physical and wireless communications links. In the context of some embodiments of the present invention, the source of the source of the various input data may be physically remote to the computer 800 such that the input data may be received and the output similarly transmitted via the communications unit 812.

The I/O interface(s) 814 allow for input and output of data with other devices that may operate in conjunction with the computer 800. For example, the I/O interface 814 may provide a connection to the external devices 820, which may be as a keyboard, keypad, a touch screen, or other suitable input devices. External devices 820 may also include portable computer readable storage media, for example thumb drives, portable optical or magnetic disks, and memory cards. Software and data used to practice embodiments of the present invention may be stored on such portable computer readable storage media and may be loaded onto the persistent storage 808 via the I/O interface(s) 814. The I/O interface(s) 814 may similarly connect to a display 822. The display 822 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    sending one or more network packets from a sending node to one or more receiving nodes, wherein each of said one or more network packets comprises a network packet header;
    receiving a negative acknowledgment list from said one or more receiving nodes, said negative acknowledgment list comprising those of said one or more network packets that were not successfully received;
    responsive to said negative acknowledgment list:
        for each network packet of said negative acknowledgment list, transforming said network packet header into a modified packet header to yield a modified packet;
        combining each said modified packet into a modified packet list;
        generating, by said sending node, one or more repair packets, each of said one or more repair packets comprising a repair packet header and a portion of said modified packet list; and
        sending said one or more repair packets to said one or more receiving nodes.

2. The computer-implemented method of claim 1, wherein said sending node comprises a transmitting device and said one or more receiving nodes comprise a receiving device.

3. The computer-implemented method of claim 1, wherein said sending node and said one or more receiving nodes exist within an internet protocol network.

4. The computer-implemented method of claim 3, wherein said internet protocol network supports a user datagram protocol.

5. The computer-implemented method of claim 4, wherein a reliable multicast protocol layer operates on top of said user datagram protocol.

6. The computer-implemented method of claim 5, wherein said reliable multicast protocol layer provides loss detection for said one or more network packets and retransmission of said one or more repair packets.

7. The computer-implemented method of claim 1, wherein said repair packet is defaulted to a maximum network transmission size.

8. A computer system, the computer system comprising:
one or more computer processors;
one or more computer readable storage media;
computer program instructions;
said computer program instructions being stored on said one or more computer readable storage media for execution by said one or more computer processors; and
said computer program instructions comprising instructions to:
send one or more network packets from a sending node to one or more receiving nodes, wherein each of said one or more network packets comprises a network packet header;
receive a negative acknowledgment list from said one or more receiving nodes, said negative acknowledgment list comprising those of said one or more network packets that were not successfully received;
responsive to said negative acknowledgment list:
for each network packet of said negative acknowledgment list, transform said network packet header into a modified packet header to yield a modified packet;
combine each said modified packet into a modified packet list;
generate, by said sending node, one or more repair packets, each of said one or more repair packets comprising a repair packet header and a portion of said modified packet list; and
send said one or more repair packets to said one or more receiving nodes.

9. The computer system of claim 8, wherein said instructions to wherein said sending node comprises a transmitting device and said one or more receiving nodes comprise a receiving device.

10. The computer system of claim 8, wherein said sending node and said one or more receiving nodes exist within an internet protocol network.

11. The computer system of claim 10, wherein said internet protocol network supports a user datagram protocol.

12. The computer system of claim 11, wherein a reliable multicast protocol layer operates on top of said user datagram protocol.

13. The computer system of claim 12, wherein said reliable multicast protocol layer provides loss detection for said one or more network packets and retransmission of said one or more repair packets.

14. The computer system of claim 8, wherein said repair packet is defaulted to a maximum network transmission size.

15. A computer program product, the computer program product comprising one or more computer readable storage media and program instructions stored on said one or more computer readable storage media, said program instructions comprising instructions to:
send one or more network packets from a sending node to one or more receiving nodes, wherein each of said one or more network packets comprises a network packet header;
receive a negative acknowledgment list from said one or more receiving nodes, said negative acknowledgment list comprising those of said one or more network packets that were not successfully received;
responsive to said negative acknowledgment list:
for each network packet of said negative acknowledgment list, transform said network packet header into a modified packet header to yield a modified packet;
combine each said modified packet into a modified packet list;
generate, by said sending node, one or more repair packets, each of said one or more repair packets comprising a repair packet header and a portion of said modified packet list; and
send said one or more repair packets to said one or more receiving nodes.

16. The computer program product of claim 15, wherein said instructions to wherein said sending node comprises a transmitting device and said one or more receiving nodes comprise a receiving device.

17. The computer program product of claim 15, wherein said sending node and said one or more receiving nodes exist within an internet protocol network.

18. The computer program product of claim 17, wherein said internet protocol network supports a user datagram protocol.

19. The computer program product of claim 18, wherein a reliable multicast protocol layer operates on top of said user datagram protocol.

20. The computer program product of claim 15, wherein said repair packet is defaulted to a maximum network transmission size.

* * * * *